United States Patent [19]
Schilling et al.

[11] Patent Number: 5,564,280
[45] Date of Patent: Oct. 15, 1996

[54] APPARATUS AND METHOD FOR REFRIGERANT FLUID LEAK PREVENTION

[76] Inventors: Ronald W. Schilling, 2282 E. Larpenter Ave., Maplewood, Minn. 55109; Vincent Miller, 1266 Halper Pl., White Bear Lake, Minn. 55110

[21] Appl. No.: 254,161

[22] Filed: Jun. 6, 1994

[51] Int. Cl.$^6$ .................. F01M 1/00; F25B 45/00
[52] U.S. Cl. .................. 62/84; 62/149; 62/498; 184/6.16
[58] Field of Search ................. 62/174, 149, 84, 62/231, 498; 184/6.16

[56] References Cited

U.S. PATENT DOCUMENTS

| | | | |
|---|---|---|---|
| 2,518,212 | 8/1950 | Wilson | 62/149 |
| 3,633,380 | 1/1972 | Pellizzetti | 62/217 |
| 3,637,048 | 1/1972 | Mount | 184/6.16 |
| 4,644,755 | 2/1987 | Esslinger | 62/126 |
| 4,890,459 | 1/1990 | Havemann | 62/126 |
| 5,009,076 | 4/1991 | Winslow | 62/129 |
| 5,044,168 | 9/1991 | Wycoff | 62/126 |
| 5,149,453 | 9/1992 | Parekh | 252/68 |
| 5,319,945 | 6/1994 | Bartlett | 62/174 |
| 5,335,511 | 8/1994 | McKeown | 62/149 X |
| 5,372,013 | 12/1994 | Lau | 62/174 |

FOREIGN PATENT DOCUMENTS

| | | | |
|---|---|---|---|
| 0153557 | 9/1985 | European Pat. Off. | 62/498 |
| 4-090454 | 3/1992 | Japan | 62/498 |

OTHER PUBLICATIONS

Thermo King "Bus Air Conditioning X426 Compressor and Clutch," Dec. 1982.

*Primary Examiner*—William E. Wayner

[57] ABSTRACT

Apparatus and method for preventing leakage of refrigerant fluid from a closed air conditioning or refrigeration system having a sealed compressor, an evaporator, a receiver and a condenser, the apparatus including a solenoid-actuated valve for segmenting the refrigerant within the closed system away from the most leak-prone area of the system. A pump is provided for the periodic spraying of lubrication fluid onto a condenser seal to prevent drying of the seal. A containment compartment or trap is provided for catching refrigerant diverted by a diversion valve, the containment compartment having an improved high pressure relief valve, with an indicator for indicating the occurrence of a high pressure exhaust of refrigerant into the atmosphere.

26 Claims, 3 Drawing Sheets

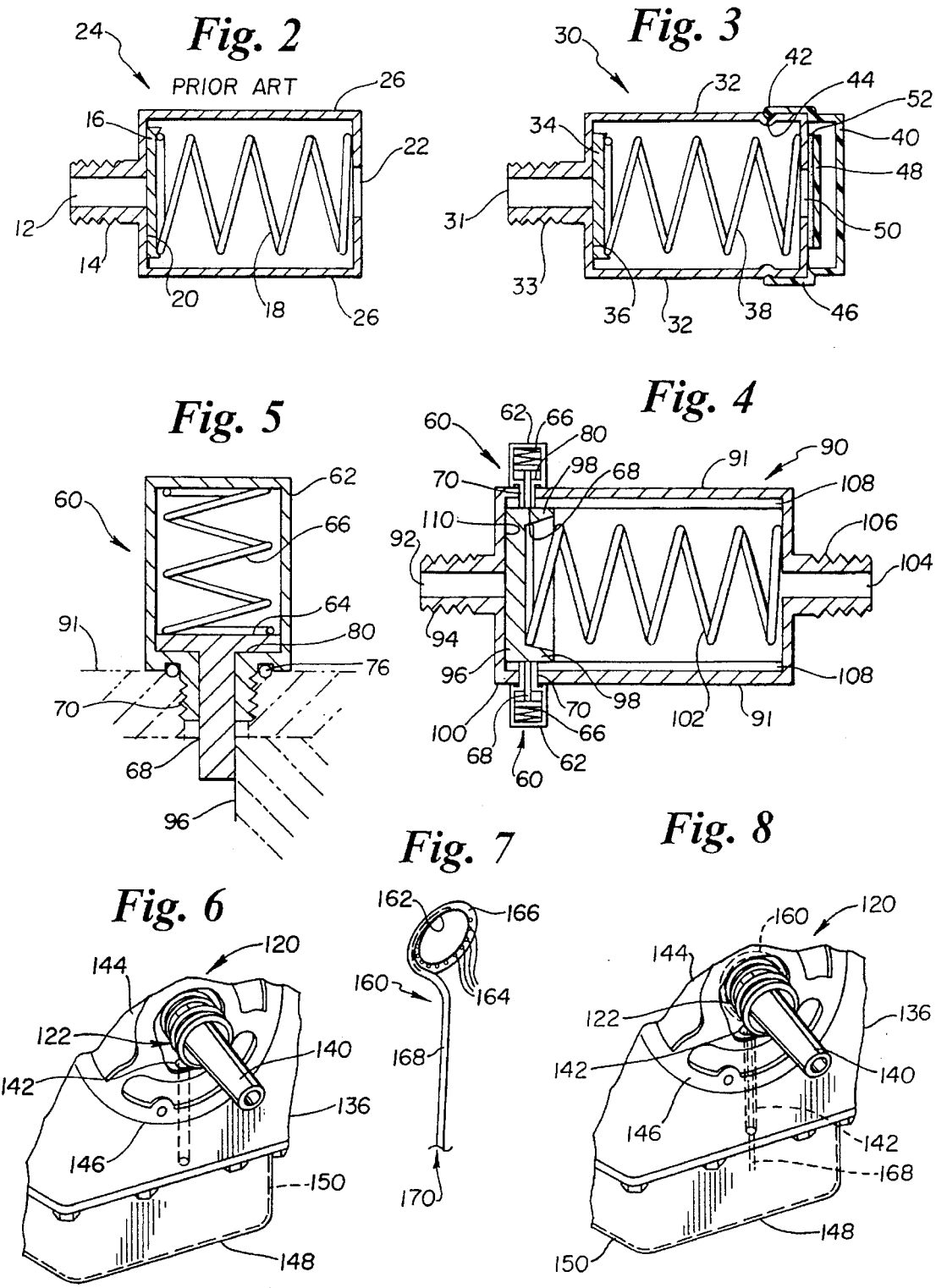

APPARATUS AND METHOD FOR REFRIGERANT FLUID LEAK PREVENTION

BACKGROUND

This invention relates to a system for air conditioning leak prevention and leak containment. This invention specifically relates to apparatus and method for pooling non-cycling refrigerant fluid away from the compressor, for lubricating a portion of a non-cycling AC system, for providing an improved high pressure relief valve having indicating means and a trap for containing the refrigerant fluid formerly discharged to the atmosphere.

Chlorofluorocarbons, or CFCs, are manmade chemicals that have been linked to the possible depletion of the earth's protective ozone layer. CFCs have been widely used as refrigerants for conditioning air and preserving food and medical supplies, among other uses.

Before scientists learned about the possible danger to the ozone layer posed by CFCs in the atmosphere, and because CFCs were cheap, replacement of CFCs rather than prevention of leaks in the air conditioning and other refrigeration systems, (hereinafter AC systems) was the method for dealing with malfunctioning AC systems. Since recognition of released CFCs as a problem there have been many attempts to monitor leaks. Most of these attempts have been chemical in nature, e.g., a replacement chemical for CFCs.

An international agreement, called the Montreal Protocol, calls for a total phaseout of ozone depleting substances, including CFCs, in developed countries. This will result in a total phase-out of production and consumption by Jan. 1, 2000. Currently, the protocol disallows leaks to the atmosphere. Additionally, under the Montreal protocol, one cannot re-charge a leaking system with refrigerant.

There have been attempts to replace CFCs with ozone-friendly chemicals. Unfortunately, none of these CFC replacements seem to work as well as CFCs at cooling. Some are even dangerous, causing a fire hazard. However, even if efficient and safe CFC replacements are developed, it would be an advantage to contain these chemicals and prevent their escape to the atmosphere, whether it be to protect the atmosphere to prevent escape of costly chemicals, or protect the user.

Of the many AC system/refrigeration system leak monitors available, there are generally those that detect the refrigerant outside of the system, those that detect air within the system and those that measure the amount of refrigerant flowing through the system.

The external refrigerant detection means include use of dyes, either visible or fluorescent, that indicate the source of leak of refrigerant out to the atmosphere.

An example of the second type of monitor systems is an air detecting monitor as found in Havemann, U.S. Pat. No. 4,890,459. This type of monitor detects the presence of oxygen in the AC system thereby indicating a leak. Havemann also provides for system shutdown if the leak continues for a predetermined period of time.

A third type of art teaches a flow monitor that measures the amount of refrigerant flowing through the AC system. When the amount of refrigerant measured falls below a certain predetermined level, the refrigerant is pooled, and an alarm is actuated. Another flow monitor utilizes a low pressure cut-off switch that precludes the operation of an AC system should the pressure to too low. The problem with this method is that by the time the pressure is low enough to activate the pressure cut-off switch, up to a large percentage of the refrigerant has already escaped into the atmosphere. The switch is used to protect the AC unit, not protect the atmosphere.

The chemicals making up refrigerant fluid, in addition to CFCs, contain a lubricant. The purpose of the lubricant is to prevent drying of seals contained by the AC system. Dry seals are more prone to leaking.

Experience has shown that, especially with the AC system used in a motor vehicle, a substantial amount of refrigerant is lost during the time the system is not running, especially during lengthy seasonal periods of time. During the seasonal "down" time, seals contained within the system are more prone to drying, because the refrigerant is not being cycled through the system, and the seals therefore become less effective. Some motor vehicle models cycle the compressor whenever the defrost function is activated. A problem with this art is the effectiveness is limited because long periods of time can elapse before the defrost function is required, cycling refrigerant, thus allowing the seals to dry.

Manually actuating cycling of the AC system during "off season" would not be an efficient solution to the problem of dry seals. Cycling the AC increases fuel consumption, and it would be haphazard at best for a consumer to attempt regular cycling of the AC system. Additionally, cycling the AC increases wear and tear on the AC system components.

Another problem is that currently, high pressure relief valves are used, exhausting refrigerant to atmosphere, as a protective measure to prevent build up of high pressure within the AC system. These current high pressure relief valves give no indication if seepage occurs or any indication that a high pressure event has occurred.

Additionally, when the AC system is found to be lacking refrigerant, the current high pressure relief valve gives no indication as to what kind of problem has occurred, whether the missing refrigerant leaked out through an unspecified area or through the high pressure relief valve. Current high pressure relief valves can seep refrigerant to atmosphere due to old age of the valve.

For the foregoing reasons, there is a need for a cost-effective mechanical system to provide continued use of CFCs while at the same time protecting the ozone layer of the atmosphere. The embodiments of this invention provide means for protecting the atmosphere, specifically, the ozone layer, either with the continued use of a known beneficial group of chemicals or other man-made refrigerant chemicals.

SUMMARY

The present invention is directed to an apparatus and method that satisfies this need for refrigerant fluid leak prevention. The apparatus, for preventing loss of refrigerant fluid from a closed air conditioning or refrigeration system, including a sealed compressor, an evaporator, a receiver and a condenser, the apparatus comprising, at least one solenoid-actuated valve for segmenting a portion of the closed system, pooling refrigerant fluid within the closed system in an area less prone to leaking, when the system is not in use.

The apparatus comprises a pump for the periodic lubrication of the compressor seal and includes means for actuation of the pump when the AC or refrigeration system is not cycling. The pump includes tubing to carry the lubricant flowing through the pump to an area near the compressor seal. The tubing has a spiral with associated dispenser orifices for directing the lubricant onto the compressor seal. An oil sump acts as a reservoir for receiving excess lubricant that drains off the compressor seal. Additional tubing feeds lubricant from the sump to the pump for recirculation onto the compressor seal. Electrical power is utilized to activate the pump. A timer can be attached to accomplish periodic lubrication of the compressor seal. In motor vehicles, the actuation of the ignition switch during the starting of the engine could signal lubrication.

A trap for containing refrigeration fluid diverted from the condenser through a diversion valve is provided. The diversion valve, which is "tripped" by a pre-determined pressure to divert refrigerant out of the closed Ac system, has a non-reseating feature which prevents the build-up of back pressure during a high pressure crisis. This non-reseating feature of the diversion valve, provided by a detention device having a plunger for interposing between the diversion valve piston and diversion valve face when the diversion valve is "tripped", allows the trap to remain in communication with the AC system until the diversion valve is either manually reseated or replaced. After this valve diverts the refrigeration fluid into a trap, the refrigerant can be recovered by means of a service port.

There are several advantages related to the inclusion of a trap in an AC system. A trap prevents release to atmosphere of CFCs, or other refrigerants, except in the case of fire or accident. If there is pressure in the trap, it is obvious to the technician that either the diversion valve leaked or a high pressure event occurred. The refrigerant exhausted to the trap can be reclaimed and reused, lowering the cost of operation of the AC system. With the addition of a trap, any exhaust of refrigerant to atmosphere would be only in event of a true emergency, e.g., a fire.

An improved pressure relief valve is provided to allow pressure relief within the AC system if the pressure reaches a predetermined level. This improved pressure relief valve has an indicator for informing the service technician that a high pressure event has occurred within the AC system and that refrigerant has been exhausted to atmosphere. This indicator can be either a diaphragm, a cap or both, positioned over a vent hole in the improved pressure relief valve. Absence of the indicator indicates a high pressure release has occurred.

A solenoid-actuated valve is provided for pooling the refrigerant fluid in an area of the AC system less prone to leaking, namely, away from the compressor. This valve is actuated when the AC system is not in use.

A method for preventing release of chemicals contained in refrigerant into the atmosphere from a closed air conditioning or refrigeration system having a sealed compressor, an evaporator and a condenser by pooling refrigerant away from leak-prone areas of the AC system, when the system is not in use, by at least one solenoid-actuated valve.

The method, as above, including diverting high pressured refrigerant into a trap, by a non-reseating diversion valve, for containment of the refrigerant. This method includes re-claiming refrigerant from the trap.

The method, as above, including providing an improved high pressure relief valve for high pressure exhaust from the trap, the improved valve including a diaphragm and or a cap for indicating when a high pressure exhaust has occurred.

The method, as above, including lubrication the compressor seal at regular pre-determined times, for preventing dryness of the seal and thus avoid refrigerant leaks around the seal.

The previously described version of the present invention has many advantages including possible enablement of continued use of CFCs with much reduced damage to the ozone layer of the atmosphere. Since the replacement chemicals for CFCs have been found to be less effective than CFCs and pose their own atmospheric risks, this is felt to be a significant improvement. Additionally, the present invention can be utilized with the chemical substitutes for CFCs.

Specifically, an advantage of the present invention is the apparatus and method for the prevention of leaks, namely, the lubrication of compressor seal.

A further advantage is the containment of leaks if they do occur as a result of seepage or a high pressure event. High pressure refrigerant is diverted into the containment trap rather than released into atmosphere.

A further advantage is the monitoring of leak occurrences by means of the improved high pressure relief valve having an indicator mounted thereon. Absence of the monitor or cap from the improved high pressure relief valve indicates refrigerant has been released into the atmosphere and that repair is needed.

An important advantage is that by keeping the compressor seal of the AC system or refrigeration system well lubricated, even when the air conditioner unit is not cycling, the seal is less likely to dry out and leak refrigerant fluid.

Another important advantage is that, when the AC system is not cycling, the solenoid-actuated valve keeps the refrigerant away from the most leak-vulnerable area of the AC system, namely, the compressor. Therefore, when the system is not cycling, the refrigerant is not leaking and loss of CFCs to the atmosphere is greatly reduced.

An additional advantage is that one or all of these elements can be added to air conditioners already in use and they can also be incorporated into new air conditioning and refrigeration units. Use of one or all of these elements enables continued use of useful chemicals, namely CFCs, or newly developed man-made chemicals yet greatly reducing damage to the earth's atmosphere as a whole and the ozone layer in particular. An important object of these embodiments is that they provide a mechanical solution rather than adding to the chemical problems related to use of refrigerants.

BRIEF DESCRIPTION OF THE DRAWINGS

Understanding of the invention will be enhanced by referring to the accompanying drawing, in which like numbers refer to like parts in the several views and in which:

FIG. 2 is a simplified mechanical diagram of a prior art relief valve;

FIG. 3 is a simplified mechanical diagram of an improved relief valve used as part of the invention;

FIG. 4 is a simplified mechanical diagram of a diversion valve using a plurality of detention devices shown in the following figure;

FIG. 5 is a simplified mechanical diagram of a detention device used as part of the invention;

FIG. 6 is a fragmentary perspective view of a typical compressor showing the input shaft and seal and having the cover removed;

FIG. 7 is a fragmentary perspective view of a serpentine oiler tubule used as part of the invention;

FIG. 8 is a fragmentary perspective view of the compressor of FIG. 6 showing the serpentine oiler tubule of FIG. 7 installed;

DETAILED DESCRIPTION OF THE PREFERRED EMBODIMENTS

Understanding of the invention will be further enhanced by referring to the following illustrative but nonlimiting example.

Overview of Main Elements

Figure 1:
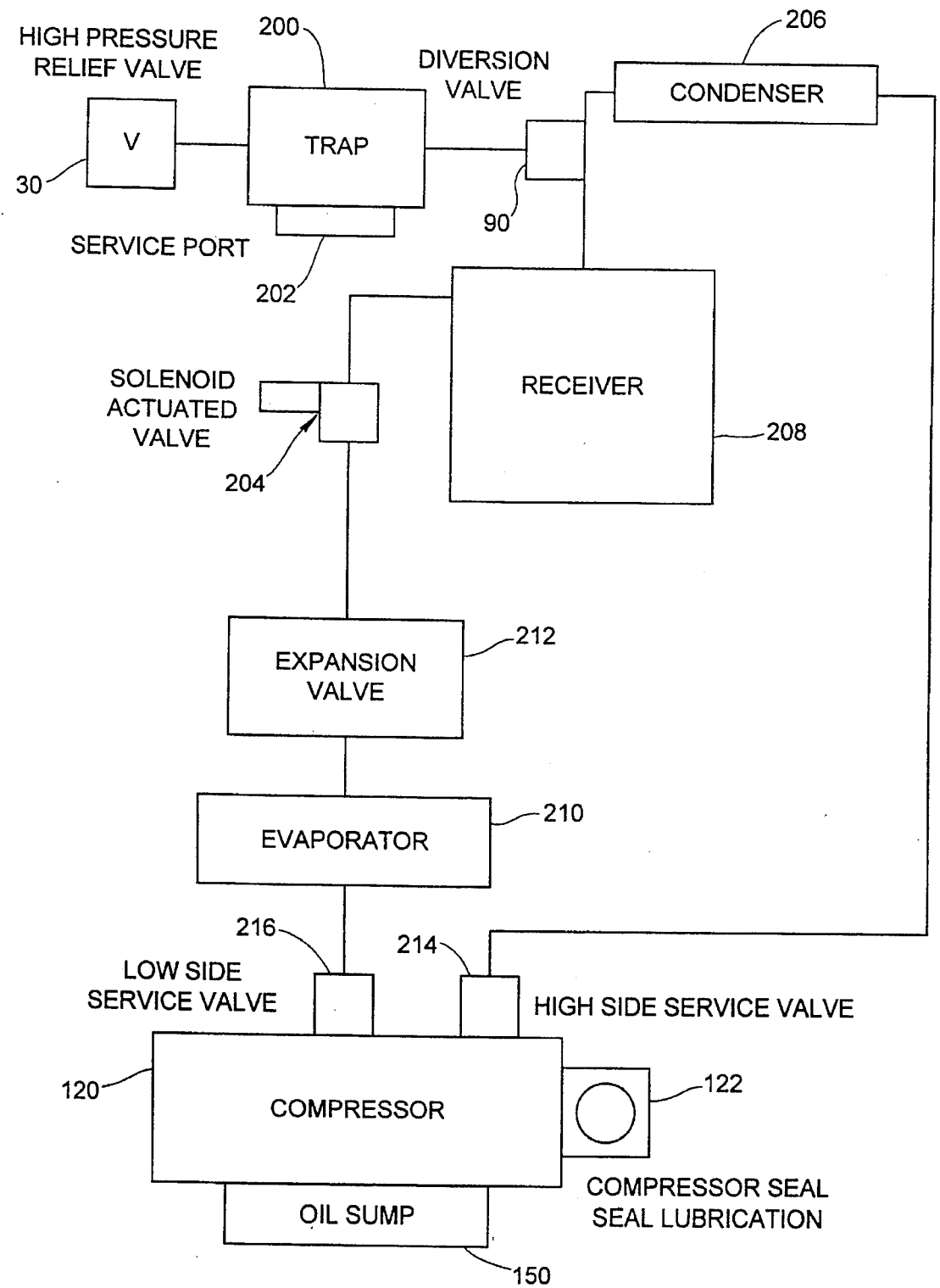
FIG. 1 is a simplified functional diagram of a typical air conditioner system that has been modified as part of the invention.

The functional diagram of FIG. 1 illustrates a typical AC system modified to include the apparatus of this invention. The AC system illustrated is that in use for a bus, however, any other AC unit could employ the changes described here. This system, illustrated at FIG. 1, has compressor 120, connected with condenser 206 that is in turn connected with receiver 208 that connects with evaporator 210 which in turn completes the circuit by connecting with compressor 120. An expansion valve 212 is shown intermediate receiver 208 and compressor 120. Low side service valve 216 and high side service valve 214 are also shown.

Solenoid-actuated valve 204, shown intermediate between receiver 208 and expansion valve 212 although it could be positioned elsewhere in the AC system, has been added to, when actuated, isolate the refrigerant fluid within the AC system away from compressor 120 when the AC system is not cycling. Typical AC compressors are designed to preclude reverse migration of refrigerant from the high pressure side of the AC system to the low pressure side. In the illustrated AC system, typical of that use in motor vehicles, working counter-clockwise, expansion valve 212 to compressor 120 is the low pressure side; compressor 120 to condenser 206, to receiver 208, to expansion valve 212 is the high pressure side. Only one solenoid-actuated valve 204 is shown because it is believed that at least minimal protection against reverse migration by into the low pressure side is provided by internal valving by compressor high pressure side. However, additional solenoid-actuated valves and/or the addition of one or more one-way check valves could be positioned elsewhere in the AC system. Check valves, not shown, prevent reverse migration by allowing flow in one direction only. They contain a spring and are always active. Solenoid actuated valves can selectively prevent reverse migration and forward migration depending on when they are actuated. Typical AC system compressors have provision to prevent back-flow from the high pressure side to the low pressure side of compressor 120. Low side service port 216 and high side service port 214, located at compressor 120, are manually actuated to segment the AC system during repair of compressor 120 to prevent loss of refrigerant during repair.

Compressor seal assembly 122 is indicated externally of compressor 120 surrounded by its own housing. Compressor 120 and compressor seal assembly 122, and their housings, compressor housing 136, compressor seal assembly housing, not shown, are connected.

The AC refrigerant contains a lubricant which prevents leakage between hard surfaces by filling any spaces therebetween. The problem has been that this lubricant only fills these spaces and lubricates compressor seal assembly 122 when the AC system is cycling the lubricant through the AC system. A problem has been how to achieve lubrication of compressor seal assembly 122 in a more regular manner without cycling the AC system. The lubrication device of this invention addresses that problem by providing lubrication of seal assembly 122 in a more regular manner without cycling the AC system.

A diversion valve 90, illustrated in detail at FIG. 4, positioned between condenser 206 and receiver 208, has been substituted for high pressure relief valve 24 of the typical AC system. Additionally, trap 200, is indicated for receiving the high pressure refrigerant fluid and/or gas formerly exhausted by high pressure relief valve 24 into the atmosphere. Trap 200 receives the diverted refrigerant fluid from diversion valve 90 and contains it until recovered by means of service port 202. Diversion valve 90 is equipped with non-reseating means, preventing a buildup of back pressure, providing communication between the AC system and trap 200. Any refrigerant captured in trap 200 can be accessed and recaptured by means of service port 202. The addition of improved high pressure relief valve 30, shown in detail at FIG. 3, with associated indicator means, cap 40 and diaphragm 48, allows high pressure relief in the case a fire, an accident to the vehicle, or other high pressure event occurs within the AC system. The indicator means 40,48 aids the repair of the system by indicating to the repair technician that seepage or a high pressure event has occurred. Formerly, the technician would either replace the supposedly faulty high pressure relief valve 24 and recharge the AC system and await the next AC system failure, or repair the seal 130, recharge the AC system and await the next AC system failure. Slow leaks, for example, are difficult to diagnose.

Trap 200, for containing refrigerant diverted by diversion valve 90, is shown intermediate condenser 206 and receiver 208 although in practice, trap 200, or a series of traps, not shown, could be placed elsewhere in the AC system. High pressure refrigerant trips diversion valve 90, generally at a pressure less than that to trip the highpressure relief valve 24, or 30. Trap 200 as illustrated would be for use in retro-fit AC systems where it would not be practical to place the bottom of trap 200 at a higher elevation than diversion valve 90. In new manufacture, trap 200 could be place at an elevation above diversion valve 90 and would therefore require neither a separate high pressure relief valve nor service port 202. In this case, valve 24 is left in the AC system and diversion valve 90 is added to the AC system. Prefferably, valve 24 would be replace by improved valve Use of the typical high pressure relief valve 24, FIG. 2, leaves no indication that refrigerant seepage or a high pressure event has occurred. Frequently, when a current AC system malfunctions, and refrigerant fluid levels are determined to be low, the repair technician has no clue where the fluid escaped.

Because of the seasonal nature of the need for AC use, the lubricating feature of the refrigerant fluid is ineffective during the time the current AC system is not cycling. The addition of a lubricant pump P, shown in detail at FIGS. 10 and 11, would periodically bathe the seal assembly 122 in lubricant, for instance every time the vehicle is actuated, prevents the drying of this seal 130 and hence deters leakage of the refrigerant fluid.

DETAILED DESCRIPTION OF EMBODIMENTS

Trap 200, indicated in FIG. 1, consists of a container having an inlet portal for receipt of high pressure refrigerant fluid from diversion valve 90, an outlet portal for insertion of improved high pressure relief valve 30 for relief on the occasion of a fire or accident causing a high pressure event, and service port 202 for retrieval of refrigerant fluid contained within trap 200. It is envisioned that trap 200 would consist of an "off the shelf" container constructed of metal, such as steel, and shaped in a generally cylindrical form, although substitutes of any geometric shape and material could be used so long as they are of a sufficient strength to contain the pressures exerted on them and designed with sufficient capacity to retain a quantity of refrigerant to reduce system pressure in the AC system as installed. For example, an additional receiver 208, with these characteristics, could be used. An alternative embodiment having a series of traps, not shown, could be utilized to give high pressure relief on a serial basis to the AC system.

An additional embodiment would provide trap 200 without a pressure relief valve. Installation of diversion valve 90 and trap 200 in the AC system prior to the high pressure relief valve, 24 or 30, eliminates the need for a high pressure relief valve on trap 200 so long as diversion valve 90 is set to divert refrigerant at a pressure less than that of the high pressure relief valve 24 or 30. Because diversion valve 90 is a non-reseating type valve, trap 200 remains in communication with the AC system. Positioning diversion valve 90 in communication with the bottom of trap 200 and placing trap 200 at a higher elevation than diversion valve removes the need for a service port to recover refrigerant.

FIG. 2 illustrates a typical high pressure relief valve comprising a cylindrical housing 26, of the type having an orifice 12 within a threaded nipple 14 for entrance of the high pressure fluid which asserts pressure on piston 16 compressing compression spring 18 which in the normal position biases piston 16 against valve face 20 and provides an air-tight environment. Compression of spring 18 unblocks vent hole 22 allowing the high pressure fluid to escape into the atmosphere.

FIG. 3 illustrates the improved high pressure relief valve 30 of this invention, having cylindrical housing 32, orifice 31, and piston 34, which seats against valve face 36 when in a first position. Internal compression spring 38 biases piston 34 against valve face 36. The improvement includes the addition of indicator means consisting of cap 40 which attaches to valve 30 by cap rim 42 snapping into detent 44 formed in distal end 46 of housing 32. Diaphragm 48 is added to block vent hole 50. Either cap 40 or diaphragm 48 can be used alone as indicator means although in a preferred embodiment, both indicators are used. Diaphragm 48 is attached to housing surrounding valve vent hole 50 by means of adhesive layer 52. Diaphragm 48 and adhesive layer 52 may be transparent. Diaphragm 48 is designed to break under minimal pressure. If valve 30 is faulty and refrigerant seeps out, this minimal pressure would break diaphragm 48 but cap 40 would remain in place. This implies to the technician that valve 30 is faulty and should be replaced. Absence of cap 40 indicates that a full-blown discharge has occurred. Cap 40, when in a first position, snaps onto distal end 46, protecting diaphragm 48 from damage by external means. The continued presence of diaphragm 48 and cap 40 on valve 30 indicates no high pressure event has occurred. Absence of diaphragm 48 and cap 40 indicates that a high pressure event has occurred. Absence of cap 40 only indicates external means rather than an internal AC system high pressure event forced removal of cap 40.

FIG. 4 illustrates diversion valve 90, having a cylindrical housing 91 and piston 96 with skirt 98 along the piston rim. Piston 96 is biased against valve face 110 of first end 100 of diversion valve 90 by compression spring 102. When highly pressurized refrigerant enters diversion valve 90 through inlet orifice 92 formed in a threaded nipple 94, the pressurized refrigerant overcomes compression spring 102 compressing the spring and moving piston 96 inwardly against spring 102. When piston 96 moves a predetermined distance within diversion valve 90, detention device 60, with its own compression spring 66, biases detention plunger 68 into an interposing position and prevents valve piston 96 from being reseated following a high pressure event. Outlet orifice 104 allows for the diverting of the highly pressurized refrigerant into trap 200 for containment as illustrated schematically in FIG. 1. Diversion valve 90 has gas channel 108 immediately inside housing 91 surrounding valve piston 96. Channel 108 permits escape of highly pressurized refrigerant around piston 96 and through outlet orifice 104 into containment trap 200.

FIG. 5 is an enlargement of detention device 60, providing the non-reseating feature to diversion valve 90 illustrated at FIG. 4. Detention device 60 consists of a cylindrical housing 62 having piston 64 biased into position by compression spring 66. Piston 64 has associated therewith plunger 68. When in the normal first position, illustrated at FIG. 4, plunger 68 is pressured into the detention device 60 by piston 96 of diversion valve 90. Plunger 68 is retained within threaded nipple 70 of detention device 60 leaving a space between piston 64 and land 80. When a high pressure event occurs, piston 96 is moved to the right, biasing compression spring 102. This movement of piston 96 releases detention plunger 68, allowing the detention device compression spring 66 to bias plunger 68 into a second position, illustrated at FIG. 5, where plunger 68 is compelled by detention compression spring 66 to force plunger 68 into a second position interposed between diversion valve piston 96 and valve face 110, preventing diversion valve piston 96 from reseating in its normal position. "O" ring 76, of rubber, completes the seal between detention device 60 and diversion valve housing 91.

FIG. 6 is a fragmentary view of a typical AC compressor 120 with the cover removed. Shown here is seal assembly 122 mounted around input shaft 140 with drain hole 142, its progress shown in phantom. Input shaft 140 fits into block 144. The cover, not shown, is bolted into place on bolt face 146. Bottom cover 148 houses oil sump 150, shown in phantom, which receives oil draining through drain hole 142.

FIG. 7 illustrates serpentine oiler tubule 160 which provides lubrication of compressor seal assembly 122, shown in position in FIG. 8. Serpentine oiler tubule 160 has spiral tubule 166 having a closed end 162. A multiplicity of dispenser orifices 164 are formed in spiral 166, allowing the lubricant to be dispensed onto compressor seal 122. The lubricant enters lubrication tubule 168 by means of tube inlet 170 and pumped to dispenser orifices 164. A pump P, indicated in FIGS. 10 and 11, pressures the lubricant up lubrication tubule 168 and out dispenser orifices 164.

FIG. 8 illustrates in phantom serpentine oiler tubule 160 in its position of use within compressor 120, positioned to lubricate compressor seal assembly 122. Oil sump 150 is indicated in phantom within bottom cover 148 of compressor 120. Lubrication tubule 168, by means of pump P, draws up oil from oil sump 150 to dispenser orifices 164 in spiral 166, thus lubricating seal assembly 122, which is positioned around input shaft 140 of compressor 120. Shown in phantom is drain hole 142 through which the excess oil drains back to oil sump 150 to be recirculated through lubrication tubule 168 onto compressor seal 122. In a preferred embodiment a seal-less, brushless pump is used although other pumps could be used. Serpentine oiler tubule 160 is shown surrounding seal assembly 122 positioned on input shaft 140. Lubrication tubule 168 is positioned within drain hole 142 and feeds into oil sump 150 where oil is drawn into lubrication tubule 168 by operation of pump P, as shown in FIGS. 10 & 11.

Figure 9:
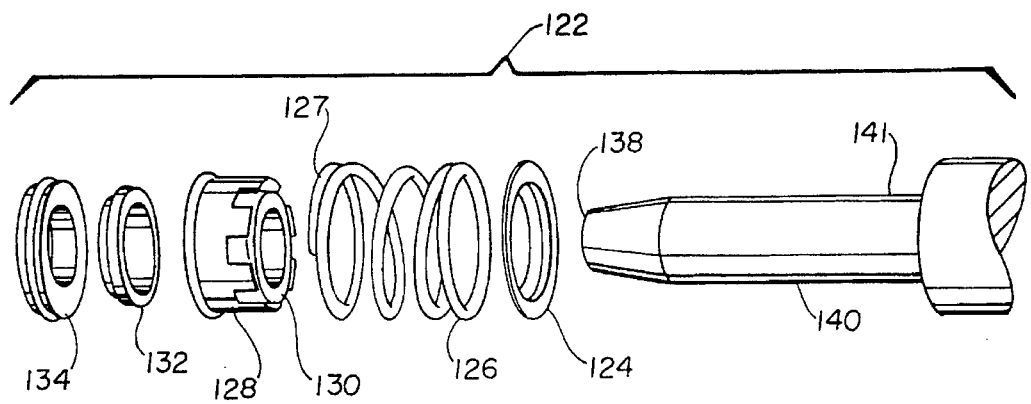
FIG. 9 is a fragmentary exploded perspective view of the input shaft and associated parts that form the subject of FIG. 6.

FIG. 9 is an exploded view of compressor seal assembly 122 surrounding input shaft 140. Washer 124, serving as a guide for compression spring 126, abuts first end 141 of input shaft 140. Second end 127 of compression spring 126 inserts into ring carrier 128. Ring carrier 128 with adjacent seal 130 is positioned on input shaft 140 intermediate carbon ring 132 and compression spring 126. Spring 126 urges ring carrier 128 and neoprene seal 130 and carbon ring 132 against hard ring 134, which abuts cover housing, not shown. Carbon ring 132 and hard ring 134 have precision machined faces and when pressed against each other they prevent migration of refrigerant through the aperture formed in the center of hard ring 134 to outside the housing and into the atmosphere. Compressor 120 is driven, in the illustrated AC system, by the vehicle motor, not shown. The vehicle motor drives input shaft 140. Seal assembly 122 precludes refrigerant from leaking along input shaft 140 to the atmosphere and at the same time prevents external contamination of the refrigerant fluid at this point in the AC system.

Seal 130, of neoprene, becomes moist and swollen with oil, grips input shaft 140 to preclude migration of refrigerant along input shaft 140 toward the cover opening, not shown. The cover opening permits passage of second end 138 of input shaft 140 through the cover, not shown. Stationary hard ring 134, with aperture 135 for receiving input shaft 140 therethrough, is installed in the cover, not shown. Carbon ring 132, with aperture 133 formed therein for receiving input shaft 140, is fitted to stationary hard ring 134. Washer 124 and spring 126 are fitted around input shaft 140 in a manner to compress spring 126. Seal 130 is sprayed with lubricant and quickly inserted into ring carrier 128 and quickly fitted onto input shaft 140. Seal 130 swells after being lubricated and holds fast to input shaft 140 holding spring 126 and washer 124 in place. Serpentine oiler tubule 160 is positioned surrounding input shaft 140 adjacent seal assembly 122, as shown in FIGS. 6 & 8. The purpose of the seal lubrication system is to spray oil onto neoprene seal 130, to prevent drying, and the outer portion of rings 132 & 134, to provide lubrication for motion of input shaft 140 and to provide a barrier to external contamination of refrigerant. In addition to oil causing the neoprene seal 130 to swell, oil sprayed onto the outer surfaces of rings 134 & 132 leaches between the faces of rings 132 & 134 helping to prevent migration of refrigerant toward second end 138 of input shaft 140 and into the atmosphere. In addition, the presence of oil on the compressor seal assembly 122 elements helps prevent moisture and air from migrating up shaft 140 into the compressor 120 contaminating refrigerant. This is especially important in AC systems that lack pressure because the refrigerant has escaped.

Figure 10:
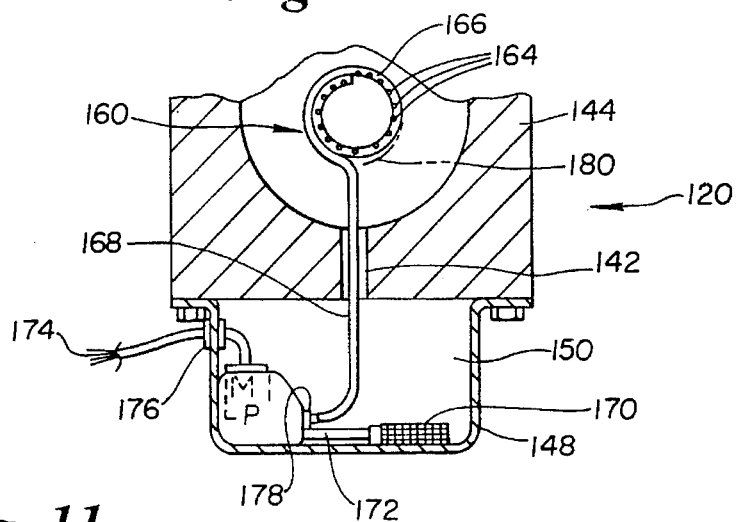
FIG. 10 is a fragmentary simplified mechanical diagram of part of the invention installed within the bottom cover of the compressor assembly.
Figure 11:
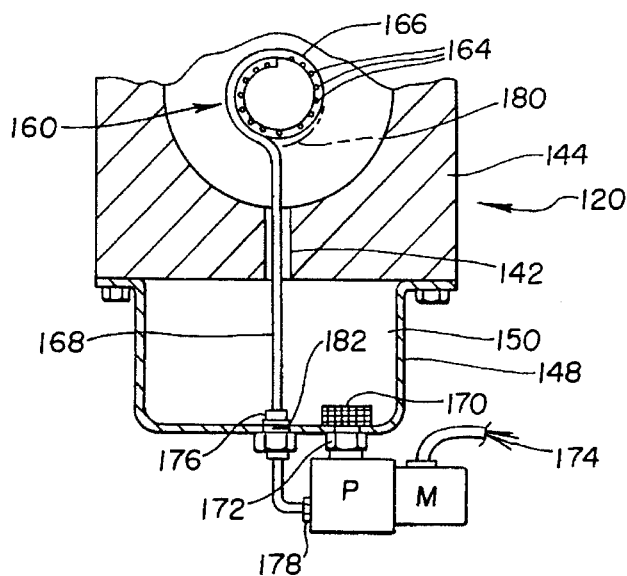
FIG. 11 is a fragmentary simplified mechanical diagram of part of the invention in an alternate form installed external of the air compressor.

FIG. 10 illustrates compressor 120 having a block 144. Serpentine oiler tubule 160 with spiral 166 and dispenser orifices 164 are shown in position within compressor block 144. Bottom cover 148 houses oil sump 150. A relieved space 180 in block 144 receives spiral 166. Oil is pumped up from oil sump 150 through pickup filter 170 into intake tube 172 which feeds the oil into pump P. Pump P has a motor, M, actuated by electrical means. Electrical leads 174 are shown leading to motor M. In actual use conditions, electrical leads 174 are connected to the vehicle battery of the engine, not shown. Seal 176 provides a tight connection where electrical leads 174 are fed into oil sump 150. In this view, pump P is shown internally of oil sump 150. Discharge fitting 178 on pump P connects lubrication tubule 168 to pump P. The oil is pumped through serpentine oiler tubule 160 and is dispensed through dispenser orifices 164 onto seal assembly 122, shown in FIG. 8. Periodic actuation of pump P can occur at any predetermined time, for example, when the engine is actuated. Additionally, a timer could be installed to actuate the pump at predetermined times. Oil sump 150 is housed within bottom cover 148 shown bolted onto the bottom side of compressor 120.

FIG. 11 illustrates pump P and motor M, with electrical leads 174, held externally of oil sump 150. Hole 182 is shown drilled into bottom cover 148 for entry of passage fittings 184 into oil sump 150. Spiral 166 is received inside relieved space 180 in block 144. Again, lubrication tubule 168 is positioned inside drain hole 142. Lubrication tubule 168 feeds oil into serpentine oiler tubule 160 for dispensing onto compressor seal assembly 122. Pickup filter 170 with adjacent intake tube 172 permits the oil from oil sump 150 to enter pump P where it is then pumped upwardly to dispenser orifices 164 where the oil is recirculated.

METHOD FOR USING INVENTION

A preferred embodiment utilizes all of the above-named modifications to eliminate or at least greatly ameliorate leakage of refrigerants to the atmosphere, although any of elements could be added to a typical AC system and lessen the amount of CFCs lost by leaking into the atmosphere.

The addition of a lubrication system is accomplished by providing a pump P for spraying lubricant onto neoprene seal 130 itself, and over rings 134 & 132. Pump P, can be installed either within sump 150, FIG. 10, or outside sump 150, FIG. 11 with the installation of lubricant tubule 168 within drain hole 142. Serpentine oiler tubule 160, in a preferred embodiment of copper although tubing of steel or plastic could be used, is positioned within a relieved space in block 180. Associated spiral 166 having dispenser orifices 164 formed therein, directs the lubricant onto compressor seal assembly 122. Drain hole 142 allows excess lubricant to return to oil sump 150 where, by means of an intake tube 172 and pickup filter 170 the lubricant is returned to pump P for recirculation onto compressor seal assembly 122. This lubrication system can be retro-fit onto an existing air conditioning system, as shown at FIG. 11 with pump P attached outside bottom cover 148, or it can be incorporated into new manufacture with pump P held internally of oil sump 150, as shown at FIG. 10. Oil sump 150 is included in a typical AC system.

The addition of diversion valve 90 and containment trap 200, which can be retro-fit into an old system or incorporated into a new manufactured system, would capture escaping refrigerants. Typical high pressure relief valve 24 is removed and replaced by diversion valve 90 by means of threaded end thereof. In a preferred embodiment, diversion valve 90 is made of brass as is a typical high pressure relief valve, although other materials, such as steel, of sufficient strength to withstand internal and external pressure could be used. Diversion valve 90 replaces typical high pressure relief valve 24 and diverts the highly pressured refrigerant into a containment trap 200 rather than releasing the refrigerant to the atmosphere.

Trap 200, in a preferred embodiment of steel as in the case of using an additional receiver or recovery bottle as a trap, although other similar materials could be used, is added to the typical AC system somewhere along the high pressure side of the AC system. For illustrative purposes, it is shown between condenser 206 and receiver 208. Trap 200 is fed by refrigerant fluid diverted by diversion valve 90 when a high pressure event occurs within the AC system. The refrigerant fluid is able to be reclaimed by accessing service port 202. The non-reseating feature of diversion valve 90 provides continued communication of trap 200 and AC system. Improved high pressure relief valve 30 is installed adjacent trap 200 for pressure relief in trap 200 in the case of fire or other emergency. Because true high pressure events occur only infrequently, it is felt that use of trap 200 of the present invention would contain a large quantity of refrigerants now lost through the typical high pressure relief valve by seepage and high pressure events. By containing the escaped CFCs in trap 200, the CFCs can be accessed through service port 202 and recycled and re-used.

An "off the shelf" solenoid-actuated valve 204 can be added anywhere along AC system that segmentation of the AC system is desired. Actuation of solenoid-actuated valve 204, normally open during cycling of the refrigerant through the AC system, when actuated, or closed, pools the refrigerant behind solenoid-actuated valve 204. For illustrative purposes, placement of solenoid-actuated valve 204 is shown between evaporator 210 and receiver 208 on the high pressure side of the AC system pools the refrigerant away from compressor 120 and the low pressure side. Additional solenoid-actuated valves 204 could be placed along the high side or low side of the typical air conditioning system to further isolate the refrigerant away from compressor 120 or any other areas deemed to be high risk of leakage. Experience has taught that most leaks occur on the low side and in compressor 120. Solenoid-actuated valve 204 could be retro-fit onto an existing system or incorporated into new manufacture.

Means for indicating a high pressure event or leakage through the improved high pressure relief valve 30 can be added to the AC system by the addition of improved high pressure relief valve 30 with either cap 40, or diaphragm 48, or by the addition of both indicator means.

Changes and modifications in the specifically described embodiments can be carried out without departing from the scope of the invention which is intended to be limited only by the scope of the appended claims.

What is claimed is:

1. Apparatus for preventing loss of refrigerant from, an air conditioning or refrigeration system, including a compressor, a condenser, a receiver, refrigerant expansion device, and an evaporator, the apparatus comprising a high-pressure diversion means, a trap for receiving over-pressurized refrigerant exhausted through the diversion means from said system, the diversion means remaining open, thereby allowing the trap to remain, at least one way, in communication with said system until serviced by service personnel.

2. The apparatus of claim 1, further comprising a diversion valve as the diversion means for diverting the over-pressurized refrigerant from said system to the trap, the diversion valve remaining open after diversion until said system is serviced.

3. The apparatus of claim 1, further comprising means for periodic lubrication of a compressor seal without cycling of the compressor.

4. The apparatus of claim 3, wherein the means for lubrication of the compressor seal further comprises:

a.) a pump for pumping lubricant, the pump having means for actuation without requiring the use of the air conditioning or refrigeration system;

b.) means for conveying the lubricant flowing through the pump to the area containing the compressor seal;

c.) a sump for collecting lubricant flowing out of the compressor seal area;

d.) a means for conveying the lubricant from the sump to the pump for conveyance to the area of the compressor seal.

5. The apparatus of claim 3, whereby the means for activation of the pump is the switching of an electrical switch that also calls for another non-related function.

6. The apparatus of claim 3, whereby the means for activation of the pump is a timer.

7. The apparatus of claim 1, that incorporates an improved pressure relief valve, the improvement comprising means for indicating the loss of refrigerant from the valve to the environment external to the system.

8. The apparatus of claim 1, wherein the indicator means further comprises a diaphragm securely attached over the exhaust aperture of the relief valve, rupture of the diaphragm occurring whenever the valve exhausts at a predetermined pressure, or seeps at a predetermined rate.

9. The apparatus of claim 8 that incorporates a cap that protects the diaphragm from harm external to the air conditioning or refrigeration system, absence of the cap and rupture of the diaphragm indicating a high-pressure event has occurred, presence of the cap and rupture of the diaphragm indicating seepage of the high-pressure relief valve.

10. The apparatus of claim 7 that incorporates a cap removably attached over the exhaust aperture of the pressure relief valve as an indicator means for indicating a high-pressure relief of refrigerant to the environment, absence of the cap indicating that a high-pressure event has occurred in said system.

11. The air conditioning or refrigeration system according to claim 1 whereby at least one solenoid actuated valve is installed, the purpose of the solenoid actuated valve means is the creation of at least two non-communicating segments, whereby in the event one segment develops a leak, said solenoid valve will preclude refrigerant flow to the leaking segment from the non-leaking segment, said solenoid valve being normally closed when the system is not in use curtails the loss of refrigerant to environment during seasonal shut down, the addition of other valves increasing environmental benefits.

12. The trap according to claim 1 whereby said diversion means is positioned between the receiver outlet and the evaporator inlet, said trap positioned relative to said diversion, whereby any reverse migration of refrigerant through said diversion means is in the form of vapor.

13. The trap according to claim 1 wherein the diversion means employs a component that will rupture at a predetermined pressure thereby permitting refrigerant flow into said trap.

14. The trap according to claim 1 wherein said trap is placed in series with a diversion means, the diversion means used for the diversion of over pressurized refrigerant from another trap that is in series with a diversion means provided on the system, thereby enabling pressure reduction in a more orderly fashion, and improving the possibility said system will continue to cool efficiently and in the case of air conditioning systems maintain a comfort level desired and in the case of a refrigeration system saving perishables.

15. A method for preventing release of refrigerant into the atmosphere from an air conditioning or refrigeration system having a compressor, a condenser, a receiver, a refrigerant metering device, and an evaporator, the method comprising the steps of:

a.) providing a non-reseating diversion means for the diversion of over pressurized refrigerant from the system;

b.) receiving and containing refrigerant diverted by the diversion means into a trap, the trap remaining in communication with said system until said system is serviced.

16. The method according to claim 15 whereby the trap incorporates an improved pressure relief valve for exhausting refrigerant from the trap should the trap become over pressurized, the improvement comprising means for indicating that the valve has allowed refrigerant to escape to the atmosphere.

17. The method of claim 16 whereby the indicator means is a diaphragm securely attached to the pressure relief valve exhaust aperture such that the diaphragm will rupture when said relief valve emits refrigerant from the exhaust aperture.

18. The method of claim 17 whereby a cap is removably attached to the exhaust end of the pressure relief valve, sheltering the diaphragm from harm external to the air conditioning or refrigeration system, presence of the cap and rupture of the diaphragm indicating seepage, absence of the cap and non-rupture of the diaphragm indicating removal of the cap by external forces, rupture of the diaphragm and absence of the cap indicating a high-pressure release.

19. The method of claim 16 whereby the indicator means is a cap removably attached to the pressure relief valve exhaust aperture, absence of the cap indicating a high-pressure relief, or sufficient seepage to cause the cap to be removed from said relief valve.

20. The method of claim 15, including means to lubricate the compressor seal without cycling the compressor, thereby providing lubrication of the compressor seal on a more regular basis when the air conditioning or refrigeration system is not in use, and in this manner preventing the compressor seal from drying and then leaking.

21. The method according to claim 15 whereby the diversion means and the trap are located relative to the system such that diversion of refrigerant liquid to said trap is maximized and any reverse migration of refrigerant through said diversion means is in the form of vapor.

22. The method according to claim 21 whereby valve means is incorporated into said system, the valve means normally closed when said system is not in use, said valve means creating at least two non-communicating segments when closed, the purpose being the prevention of a non-leaking segment providing refrigeration chemicals to a potential leaking segment, thereby reducing loss of said refrigeration chemicals into the atmosphere.

23. Apparatus for preventing loss of refrigeration chemicals from an air conditioning or refrigeration system including a compressor, a condenser, a receiver, a refrigerant expansion means and an evaporator, the apparatus comprising:

a) a solenoid actuated valve that is normally closed when the system is not in use, said solenoid valve used for the purpose of creating non-communicating segments in said system, thereby preventing one non-leaking segment from providing refrigeration chemicals to another potential leaking segment, hence reducing overall environmental damage;

b) a pump for pumping lubricant, the pump electrically operated when manually turned on, using an electrical circuit not associated with cooling of said system;

c) conduit means to convey lubricant from the pump to the area of the compressor seal assembly thereby moistening said compressor seal assembly;

d) a sump with conduit means for collecting excess lubricant flowing from said seal assembly area;

e) conduit means to convey lubricant from the sump to said pump for recirculation to said seal assembly.

24. Apparatus for preventing loss of refrigerant from an air conditioning or refrigeration system including a compressor, a condenser, a receiver, an expansion device and an evaporator, the apparatus comprising:

a) a solenoid actuated valve that is normally closed when the system is not in use, the solenoid valve used for the purpose of creating two non-communicating segments, thereby preventing a non-leaking segment from providing refrigerant flow to a potential leaking segment during periods when the system is not in use;

b) a trap for receiving refrigerant exhausted through a diversion means the diversion means opening at a predetermined pressure, said diversion means remaining open until serviced by service personnel, said diversion means provided to relieve pressure during a high pressure crisis in said system.

25. The system according to claim 24 that incorporates an indicating pressure relief valve wherein the indicator means comprises a diaphragm and securely attached over the exhaust aperture of the relief valve that the diaphragm will rupture at a predetermined seepage rate of refrigerant pressure from the system through said relief valve.

26. The relief valve according to claim 25 whereby a protective means is incorporated over said diaphragm, the protective means being non-hermetically sealed on the valve protects said diaphragm from harm external to the air conditioning or refrigeration system, said protective means secured on said valve whereby a predetermined force greater than that needed to rupture said diaphragm is required to cause removal of said protective means from said valve, and in this manner determination can be made that loss of refrigerant from said system was due to seepage which indicated a bad valve, or if the loss of refrigerant was due to a high pressure condition in said system.

* * * * *